United States Patent [19]
Kolmanovsky et al.

[11] Patent Number: 6,067,800
[45] Date of Patent: May 30, 2000

[54] CONTROL METHOD FOR A VARIABLE GEOMETRY TURBOCHARGER IN A DIESEL ENGINE HAVING EXHAUST GAS RECIRCULATION

[75] Inventors: Ilya V. Kolmanovsky, Ypsilanti; Michiel J. Van Nieuwstadt, Ann Arbor, both of Mich.; Paul Eduard Moraal, Wuerselen, Germany

[73] Assignee: Ford Global Technologies, Inc., Dearborn, Mich.

[21] Appl. No.: 09/237,634

[22] Filed: Jan. 26, 1999

[51] Int. Cl.[7] ........................................ F02D 23/00
[52] U.S. Cl. ................................................ 60/602
[58] Field of Search ................................... 60/602

[56] References Cited

U.S. PATENT DOCUMENTS

| | | |
|---|---|---|
| 5,123,246 | 6/1992 | Younessi . |
| 5,228,292 | 7/1993 | Hanauer . |
| 5,273,019 | 12/1993 | Matthews . |
| 5,505,174 | 4/1996 | Komoriya . |
| 5,520,161 | 5/1996 | Klopp . |

FOREIGN PATENT DOCUMENTS

| | | |
|---|---|---|
| 0 774 574 A1 | 5/1997 | European Pat. Off. . |
| 0 786 589 A1 | 7/1997 | European Pat. Off. . |

*Primary Examiner*—Noah P. Kamen
*Attorney, Agent, or Firm*—Jerome R. Drouillard

[57] ABSTRACT

A method of estimating the actuator position of a variable geometry turbocharger (VGT) of a compression ignition engine having an exhaust gas recirculation (EGR) system. The method includes the steps of determining the exhaust manifold temperature ($T_2$), determining the mass flow rate ($W_{2t}$) through the turbocharger turbine, determining the exhaust manifold pressure ($p_2$), determining the turbine back-pressure ($p_{exs}$), and generating a VGT actuator position estimate ($\alpha_{vgt}$) as a function of $W_{2t}$, $T_2$, $p_2$, and $p_{exs}$. The estimated VGT actuator position is then used to generate an error term indicative of the difference between the estimated and desired VGT actuator position. The error term can then be used to drive the VGT actuator to its desired position to regulate the intake manifold pressure.

10 Claims, 4 Drawing Sheets

6,067,800

CONTROL METHOD FOR A VARIABLE GEOMETRY TURBOCHARGER IN A DIESEL ENGINE HAVING EXHAUST GAS RECIRCULATION

TECHNICAL FIELD

This invention relates to turbocharged compression ignition engines having exhaust gas recirculation systems and, more particularly, to methods of controlling a variable geometry turbocharger (VGT) actuator position in diesel engines equipped with an exhaust gas recirculation (EGR) system.

BACKGROUND OF THE INVENTION

High performance, high speed diesel engines are often equipped with turbochargers to increase power density over a wider engine operating range, and EGR systems to reduce the production of NOx emissions.

Turbochargers use a portion of the exhaust gas energy to increase the mass of the air charge delivered to the engine combustion chambers. The larger mass of air can be burned with a larger quantity of fuel, thereby resulting in increased power and torque as compared to naturally aspirated engines.

A typical turbocharger consists of a compressor and turbine coupled by a common shaft. The exhaust gas drives the turbine which drives the compressor which, in turn, compresses ambient air and directs it into the intake manifold. Variable geometry turbochargers (VGT) allow the intake airflow to be optimized over a range of engine speeds. This is accomplished by changing the angle of the inlet guide vanes on the turbine stator. An optimal position for the inlet guide vanes is determined from a combination of desired torque response, fuel economy, and emissions requirements.

EGR systems are used to reduce NOx emissions by increasing the dilution fraction in the intake manifold. EGR is typically accomplished with an EGR valve that connects the intake manifold and the exhaust manifold. In the cylinders, the recirculated exhaust gas acts as an inert gas, thus lowering the flame and in-cylinder gas temperature and, hence, decreasing the formation of NOx. On the other hand, the recirculated exhaust gas displaces fresh air and reduces the air-to-fuel ratio of the in-cylinder mixture.

Both the VGT and EGR regulate gas flow through the exhaust manifold and their effect is, therefore, jointly dependent upon the conditions in the exhaust manifold. Excessive EGR rates displace the intake of fresh air and may lead to incomplete combustion of the injected fuel which, in turn, could cause visible levels of smoke to occur. In addition, in engines equipped with a VGT, the actual flow through the EGR valve can vary greatly, even for a fixed EGR valve opening, due to exhaust pressure fluctuations generated by opening or closing the inlet guide vanes to the VGT.

Accordingly, for optimum engine performance, it is important to have accurate knowledge of the VGT actuator position. Specifically, in a typical engine control system, the VGT is used to regulate the mass airflow (MAF) and the EGR is used to regulate the intake manifold pressure (MAP). Because the steady-state engine map with respect to the VGT position is not monotonic, however, a controller that uses VGT to regulate MAF tracking must account for the VGT position. This is demonstrated in FIG. 1.

FIG. 1 shows the steady-state values of compressor mass airflow rate (MAF) at an engine speed of 2000 rpm, and a fueling rate of 4.0 kg/hr. Each line on the graph represents a constant EGR valve position wherein 0.0 is fully closed and 1.0 is fully open, and a varying VGT actuator position wherein 0.0 is fully closed and 1.0 is fully open. As can be seen from FIG. 1, at point 100 ($X_{egr}$=1.0, $X_{vgt}$=0.2), opening the VGT increases MAF, while at points 102 ($X_{egr}$=0.0, $X_{vgt}$=0.2) and 104 ($X_{egr}$=0.0, $X_{vgt}$=0.8) opening the VGT decreases MAF.

Thus, knowledge of the VGT position is important for effective MAF control and, hence, turbo-lag reduction. Position sensors for electronic and pneumatic VGT actuators, however, are often undesirable due to packaging constraints and added expense to the overall engine control system.

In addition, for monitoring and controlling the state of exhaust treatment devices such as diesel particulate traps, lean NOx traps, and catalytic converters, measurements of the turbine mass flow rate, exhaust manifold temperature, and turbine back-pressure are necessary. All of these measurements can be provided by mass flow, temperature, or pressure sensors, respectively, however, such sensors add additional expense and may add complexity to the overall engine control strategy.

DISCLOSURE OF THE INVENTION

One object of the present invention is to provide an improved compression ignition engine control strategy.

Another object is to dynamically estimate the VGT actuator position, turbine back-pressure, and exhaust manifold temperature using a reduced sensor set.

According to the present invention, the foregoing and other objects and advantages are obtained by a method of estimating the VGT actuator position in a compression ignition engine having an EGR system. The method includes the steps of determining the exhaust manifold temperature ($T_2$), determining the mass flow rate ($W_{2t}$) through the turbocharger turbine, determining the exhaust manifold pressure ($p_2$), determining the turbine back-pressure ($p_{exs}$), and generating an VGT actuator position estimate ($\alpha_{vgt}$) as a function of $W_{2t}$, $T_2$, $p_2$, and $p_{exs}$. The estimated VGT actuator position is then used generate an error term indicative of the difference between the estimated and desired VGT actuator position. The error term can then be used to drive the VGT actuator to its desired position to regulate the intake manifold pressure.

The control system is advantageous in that it enables direct closed loop control of the VGT actuator position and/or turbine mass flow rate. The control system thus has less sensitivity to VGT actuator imperfections or instabilities which may result from variable forces on the turbine guide vanes due to exhaust gas flow. The estimator also allows for improved diagnostics of exhaust system problems such as restrictions due to a damaged muffler or deposits. The method also allows for VGT actuator diagnostics. For example, a malfunctioning VGT actuator can be detected if a modified duty cycle signal is transmitted to the VGT actuator and the estimate of the VGT actuator position does not change.

Other objects and advantages of the invention will become apparent upon reading the following detailed description and appended claims, and upon reference to the accompanying drawings.

BRIEF DESCRIPTION OF THE DRAWINGS

For a more complete understanding of the invention, reference should be made to the embodiments illustrated in greater detail in the accompanying drawings and described below by way of examples of the invention. In the drawings.

DESCRIPTION OF THE PREFERRED EMBODIMENT

Figure 1:
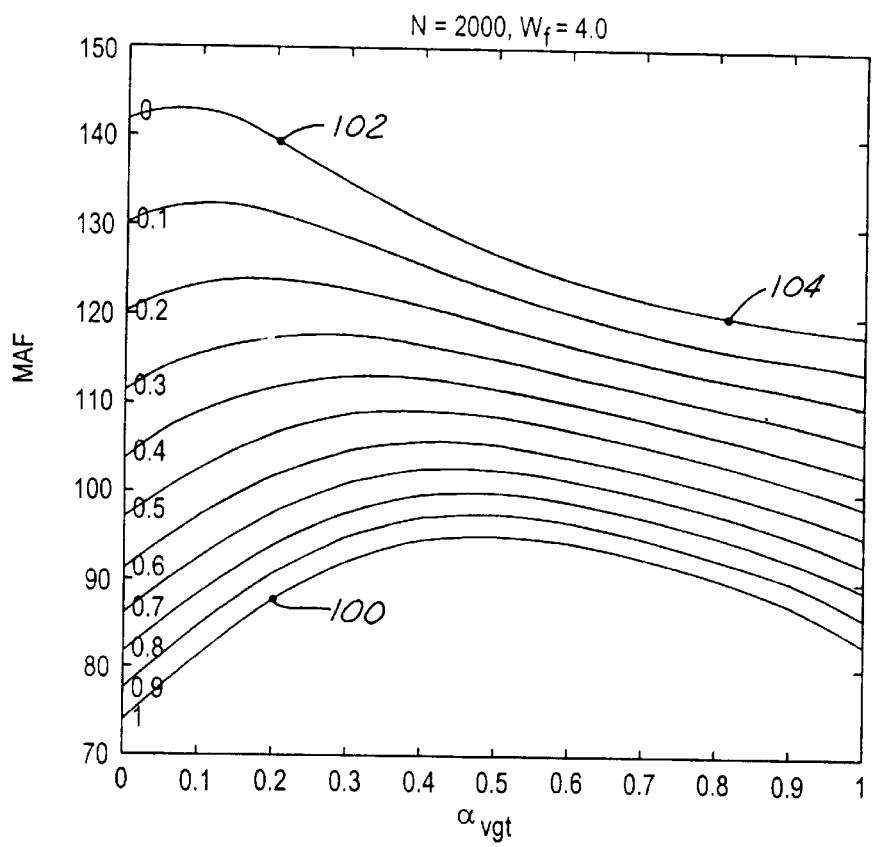
FIG. 1 is a the steady-state map of the compressor mass air flow rate (MAF) for a constant EGR valve position and varying VGT actuator position.

Turning first to FIG. 1, there is shown a simplified schematic diagram of a compression ignition engine system 10 equipped with an exhaust gas recirculation (EGR) system 12 and a variable geometry turbocharger (VGT) 14. A representative engine block 16 is shown having four combustion chambers 18. Each of the combustion chambers 18 includes a direct-injection fuel injector 20. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

To reduce the level of NOx emissions, the engine is equipped with an EGR system 12. The EGR system 12 comprises a conduit 32 connecting the exhaust manifold 28 to the intake manifold 26. This allows a portion of the exhaust gases to be circulated from the exhaust manifold 28 to the intake manifold 26 in the direction of arrow 31. An EGR valve 34 regulates the amount of exhaust gas recirculated from the exhaust manifold 28. In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture.

The turbocharger 14 uses exhaust gas energy to increase the mass of the air charge delivered to the engine combustion chambers 18. The exhaust gas flowing in the direction of arrow 30 drives the turbocharger 14. This larger mass of air can be burned with a larger quantity of fuel, resulting in more torque and power as compared to naturally aspirated, non-turbocharged engines.

The turbocharger 14 consists of a compressor 36 and a turbine 38 coupled by a common shaft 40. The exhaust gas 30 drives the turbine 38 which drives the compressor 36 which, in turn, compresses ambient air 42 and directs it (arrow 43) into the intake manifold 26. The VGT 14 can be modified as a function of engine speed during engine operation by varying the turbine flow area and the angle at which the exhaust gas 30 is directed at the turbine blades. This is accomplished by changing the angle of the inlet guide vanes 44 on the turbine 38.

All of the engine systems, including the EGR 12, VGT 14 and fuel injectors 20 are controlled by the ECU. For example, signal 46 from the ECU 24 regulates the EGR valve position, and signal 48 regulates the position of the VGT guide vanes 44.

In the ECU 24, the command signals 46, 48 to the EGR 12 and VGT 14 actuators are calculated from measured variables and engine operating parameters by means of a control algorithm. Sensors and calibratable lookup tables residing in ECU memory provide the ECU 24 with engine operating information. For example, an intake manifold pressure (MAP) sensor 50 provides a signal 52 to the ECU indicative of the pressure in the intake manifold 26. Likewise, exhaust manifold pressure (EXMP) sensor 54 provides a signal 56 to the ECU 24 indicative of the pressure in the exhaust manifold 28. Further, an intake manifold temperature sensor 58 provides a signal 60 to the ECU 24 indicative of the intake manifold temperature. A mass airflow (MAF) sensor 64 also provides a signal 66 indicative of the compressor mass airflow to the ECU 24.

Additional sensory inputs are also received by the ECU along signal line 62 such as engine coolant temperature, engine speed, and EGR valve position. Additional operator inputs 68 are received along signal 70 such as the accelerator pedal position or other fueling request input.

The engine control methods described herein apply to all turbocharged compression ignition engines equipped with EGR systems, regardless of the type of fuel used. Thus, it is to be understood that references to diesel engines are equally applicable to other compression ignition engines as well. In addition, throughout the specification, the following notations are used in describing measured or calculated variables:

| | |
|---|---|
| p | pressure (kPa) |
| T | temperature (K) |
| m | mass (kg) |
| W | mass flow (kg/s) |
| F | burnt gas fraction |
| $\alpha_{egr}$ | EGR valve position |
| $\alpha_{vgt}$ | VGT actuator position |
| N | engine speed (rpm) |
| d | density |
| $n_{vol}$ | engine volumetric efficiency |
| $P_{exs}$ | turbine outlet pressure |
| $V_d$ | engine displacement volume |

Furthermore, the following subscripts are used to denote regions of the engine system:

| | |
|---|---|
| 1 | intake manifold 26 |
| 2 | exhaust manifold 28 |
| e | engine 16 |
| t | turbine 38 |
| c | compressor 36 |
| f | fuel |

Finally, the following thermodynamic constants are referenced for air at 300K:

| | |
|---|---|
| $c_p$ 1.0144 kJ/kg/K | $1R = C_p - C_v$ |
| $c_v$ 0.7274 kJ/kg/K | $\gamma = C_p/C_v$ |
| $\phi_s = 1/14.4$ | |

Hence, the symbol $p_1$, for example, refers to the intake manifold pressure in kPa. Combined subscripts, such as "e2", refer to flows from the first to the second subsystem.

Figure 3:
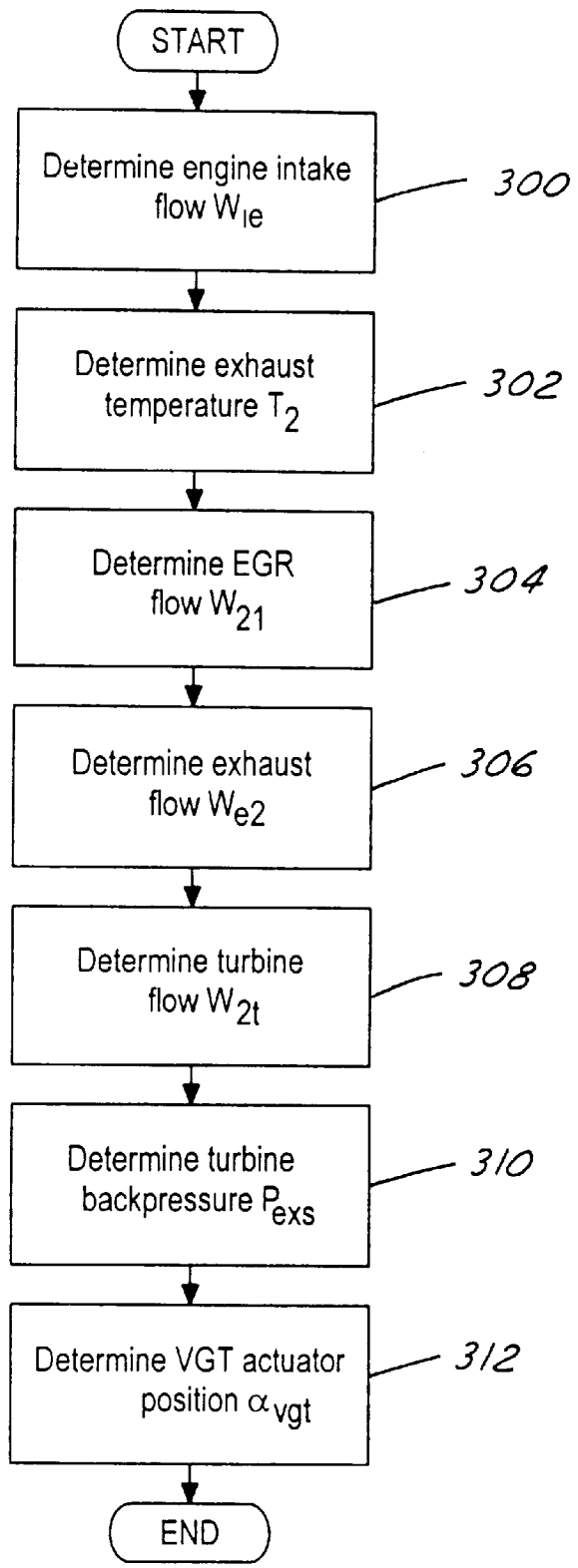
FIG. 3 is a logic diagram of an engine control method in accordance with one embodiment of the present invention.

FIG. 3 describes the logic routine to accomplish VGT actuator control based on intake and exhaust pressure, engine speed, compressor outlet temperature, engine coolant temperature and EGR valve position. This logic routine resides in the ECU memory and is executed as part of the routine used to control the VGT actuator and EGR valve positions.

Figure 2:
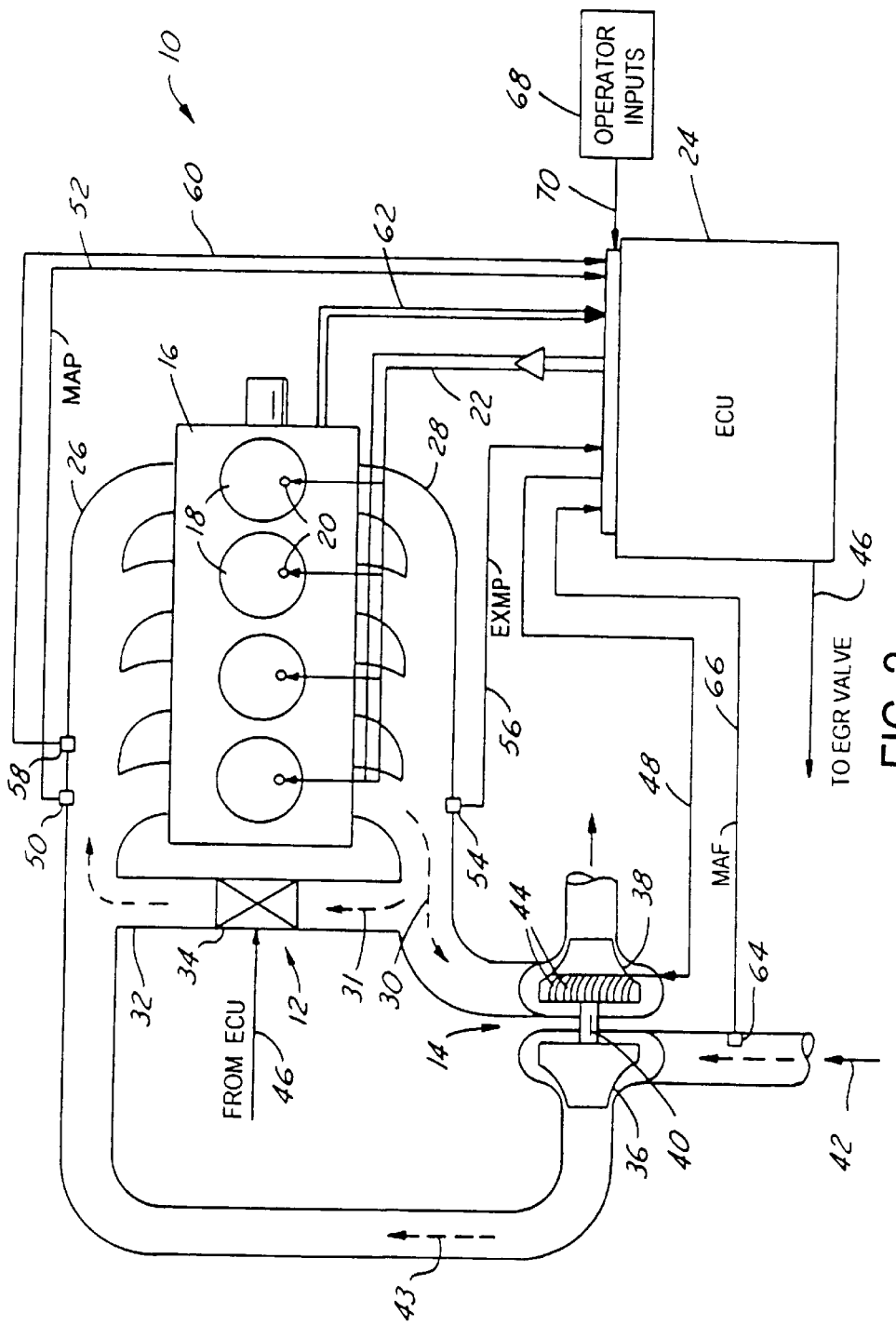
FIG. 2 is a schematic view of a compression ignition engine system having an EGR system and a VGT in accordance with one embodiment of the present invention.

In step 300, the engine intake flow ($W_{1e}(k)$) is calculated as a function of the volumetric efficiency of the engine based on measured or estimated engine operating parameters. The engine intake flow is then given by:

$$W_{1e}(k)=(p_1 N n_{vol}/(V_d R T_1 120))=k_{1e}p_1 \quad (1)$$

wherein N represents the engine speed, $V_d$ represents the displacement volume of the engine, and $n_{vol}$ represents the volumetric efficiency of the engine. The volumetric efficiency is stored in the ECU memory as a function of one or more of the following variables: engine speed, engine coolant temperature, fueling rate, intake manifold pressure and exhaust manifold pressure. These estimated values for $n_{vol}$ can be further corrected using engine coolant temperature measurements to account for volumetric efficiency differences during cold start. In equation (1), $T_1$ is the intake manifold temperature which can be either measured from sensor 58 of FIG. 2, or estimated based on the engine speed, fueling rate and intake air charge temperature.

Alternatively, rather than estimating $W_{1e}(k)$ using $n_{vol}$ as in equation (1), the values of the pumping constant $k_{1e}$ can be derived as a function of measured or estimated engine parameters and used in the estimation of $W_{1e}(k)$.

The value of $W_{1e}(k)$ from step 300 is used to estimate the exhaust manifold temperature $T_2$ in step 302. This estimation is based on the principal that a portion of the energy released by combusting fuel, $k_0(N)W_f$, is absorbed by the exhaust gas in the form of a temperature increase. Thus:

$$T_2 = T_1 + k_0(N)W_f/(W_{1e}c_p) \quad (2)$$

The function $k_0(N)$ is determined from engine mapping data and $T_1$ can be either measured, estimated, or given a constant value. Embodiments where $k_0$ depends upon other variables are also possible.

Given an estimate of the exhaust manifold temperature, the EGR flow $W_{2i}(k)$ is estimated in step 304. A static map is used to determine the mass flow rate through the EGR valve using the standard orifice equation:

$$W_{2i}(k)=f_1(\alpha_{egr})p_2/(RT_2)^{1/2}\phi(p_1/p_2) \quad (3)$$

In equation (3), $f_1(\alpha_{egr})$ represents the effective flow area of the EGR valve as a function of the position of the EGR valve. These values are stored as a lookup table in ECU memory. In addition, R represents the difference between the pressure specific heat constant and volume specific heat constant, and $\phi$ represents a standard orifice equation having the following form:

$$\phi(r)=[(2\gamma/(\gamma-1))(r^{2/\gamma}-r^{(\gamma+1)/\gamma})]^{1/2}$$

for $r \geq (2/(\gamma+1))^{\gamma/(\gamma-1)}$ $$\phi(r)=\gamma^{1/2}(2/(\gamma+1))^{(\gamma+1)/(2(\gamma-1))}$$

for $r < (2/(\gamma+1))^{\gamma/(\gamma-1)}$

In step 306, the flow through the exhaust manifold is given by the steady-state mass conservation:

$$W_{e2}(k)=W_{1e}(k)+W_f(k) \quad (4)$$

To account for engine cycle delays, $W_{1e}(k)$ and $W_f(k)$ can also be passed through first order linear filters with appropriate time constants.

In step 308, the turbine flow $W_{2t}$ is estimated from a recursive filter. To calculate $W_{2t}$, the density in the exhaust manifold is first estimated from the ideal gas law as follows:

$$d_2=p_2/(RT_2) \quad (5)$$

From application of a continuous-time Laplace transform to the mass conservation, the density is expressed as:

$$d(d_2)/dt \approx (1/(s/\tau_2+1))(1/V_2)(-W_{2t}-W_{2t}+W_{e2}) \quad (6)$$

wherein s is the Laplace variable, $\tau_2$ is the filter time constant which is tunable, and $V_2$ represents the exhaust manifold volume.

Assume:

$$\lambda=(1/(s/\tau_2+1))(W_{e2}-W_{2t})$$

and let the low-pass filtered value of $\underline{W_{2t}}$ be:

$$\underline{W_{2t}}=(1/(s/\tau_2+1))(W_2)$$

then allowing the estimated value of $W_{2t}$ to equal the low-pass filtered value, results in:

$$W_{2t}=\underline{W_{2t}}=-V_2 d(d_2)/dt+\lambda \quad (7)$$

To implement the estimator of $W_{2t}$ in the digital ECU controller, equation (7) is broken down into discrete time periods as follows:

$$\lambda(k+1)=\lambda(k)+\tau_2 T_s(-\lambda(k)+W_{e2}(k)-W_{2t}(k))$$

$$dd(k)/dt=\tau_2(d_2(k)-z_2(k))$$

$$z_2(k+1)=z_2(k)+\tau_2 T_s(-z_2(k)+d_2(k))$$

wherein $T_s$ represents the sampling period.

The turbine back-pressure is then estimated in step 310 using a quadratic polynomial to estimate $p_{exs}$ from $W_{2t}$:

$$p_{exs}=a_0+a_1 W_{2t}+a_2 W_{2t}^2 \quad (8)$$

Wherein $a_0$, $a_1$, and $a_2$ are experimentally determined constant values developed from mapping the turbine back-pressure as a function of the mass flow rate through the turbine.

From the foregoing, the VGT actuator position is estimated in step 312. Experimentation revealed that the mass flow rate through the turbine is only weakly dependent on the turbocharger speed. This dependence is negligible and, therefore, not necessary to estimate the VGT actuator position. Accordingly, the turbine effective flow area ($A_{vgt}(\alpha_{vgt})$) is calculated from the modified orifice flow equation as follows:

$$A_{vgt}(\alpha_{vgt})=W_{2t}(T_2)^{1/2}/(p_2 \Psi(p_{exs}/p_2)) \quad (9)$$

where $$\Psi(x)=[(x-g+1)^{2/B}-(x-g+1)^{(B+1)/B}]^{1/2} \quad (10)$$

for $x>PR_c$, and $$\Psi(x)=[(PR_c-g+1)^{2/B}-(PR_c-g+1)^{(B+1)/B}]^{1/2} \quad (11)$$

for $x \leq PR_c$.

In equations (10) and (11), the parameters $PR_c$, B, and g are regressed from turbine data supplied by the turbocharger manufacturer, or developed from data collected during engine mapping.

The effective flow area can also be expressed as:

$$A_{vgt}(\alpha_{vgt}) = (\tfrac{1}{2})(\Theta_1 \alpha_{vgt} + \Theta_2) \quad (12)$$

wherein $\Theta_1$ and $\Theta_2$ represent parameters that are regressed from turbine data supplied by the turbocharger manufacturer, or developed from data collected during engine mapping. A map of the VGT effective flow area as a function of the VGT actuator position is stored in ECU memory.

Figure 4:
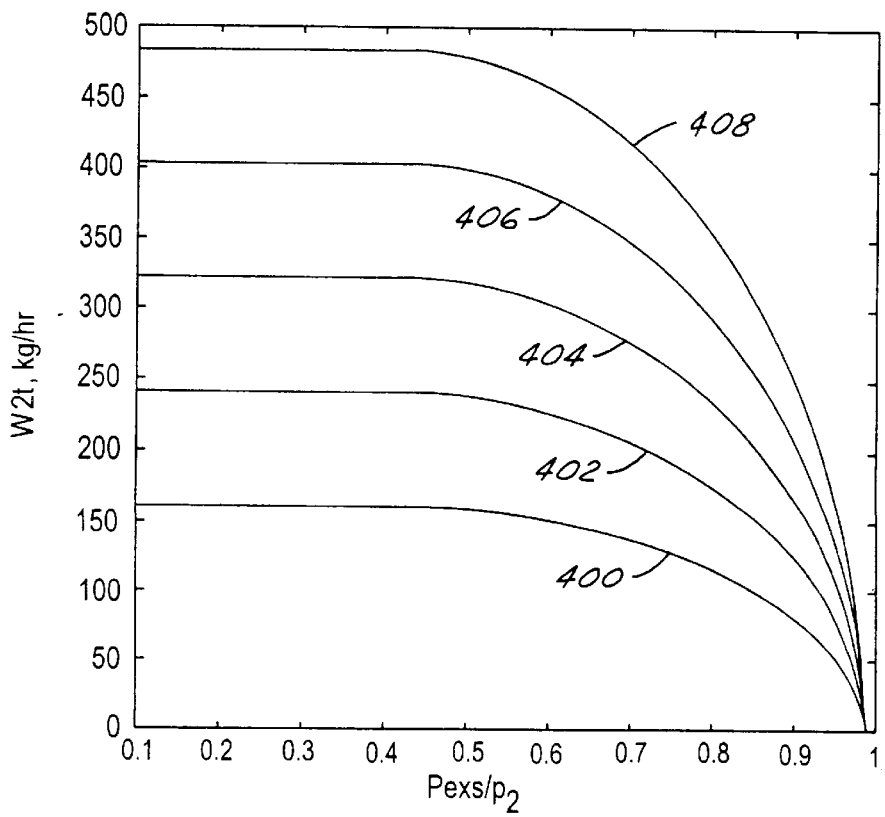
FIG. 4 graphs the estimated mass flow rate through the VGT turbine as a function of the pressure ratio across the turbine.

FIG. 4 graphs the estimated mass flow rate through the VGT turbine as a function of the pressure ratio across the turbine for various VGT actuator positions. A 2.0 liter engine having the following characteristics was used to develop the data illustrated in FIG. 4: $PR_c=0.44$, $g=0.98$, $B=2.1$, $\Theta_1=0.056$, and $\Theta_2=0.028$. The actuator position $\alpha_{vgt}$ varied from between 0.0 and 1.0 wherein 1.0 corresponds to the fully open position and 0.0 corresponds to the fully closed position. In FIG. 4, lines 400, 402, 404, 406 and 408 represent VGT actuator positions 0.0, 0.25, 0.5, 0.75, and 1.0, respectively.

The effective flow area map is then inverted to yield the VGT actuator position:

$$\alpha_{vgt} = A_{vgt}^{-1}(\alpha_{vgt}) \quad (13)$$

Given an estimate of the VGT actuator position from equation (13), the VGT actuator position value can be used in any known manner regulate the turbine flow and, hence, MAP. One such control method includes the steps of determining a desired VGT actuator position as a function of the engine speed and requested fueling rate, and generating an error term indicative of the difference between the desired VGT actuator position and the estimated VGT actuator position. From the error term, a duty cycle for the VGT actuator can readily be determined and transmitted along signal line 48 of FIG. 2 to drive the estimated VGT actuator to the desired value. Any known controller can be used to drive the VGT actuator to the desired position, such as a proportional plus integral controller.

Figure 5A:
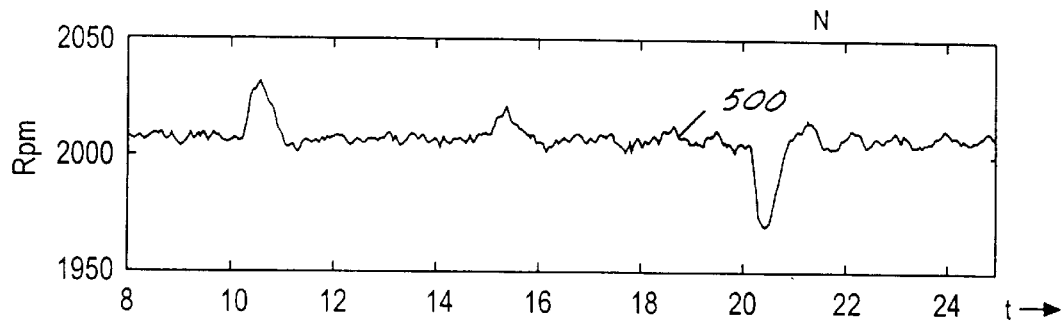
FIGS. 5a through 5c illustrate the estimated versus actual VGT actuator position according to the logic diagram of FIG. 3.
Figure 5B:
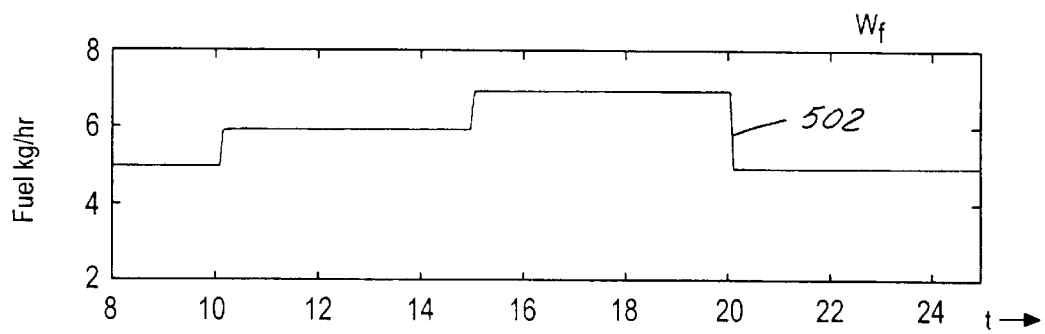
Figure 5C:
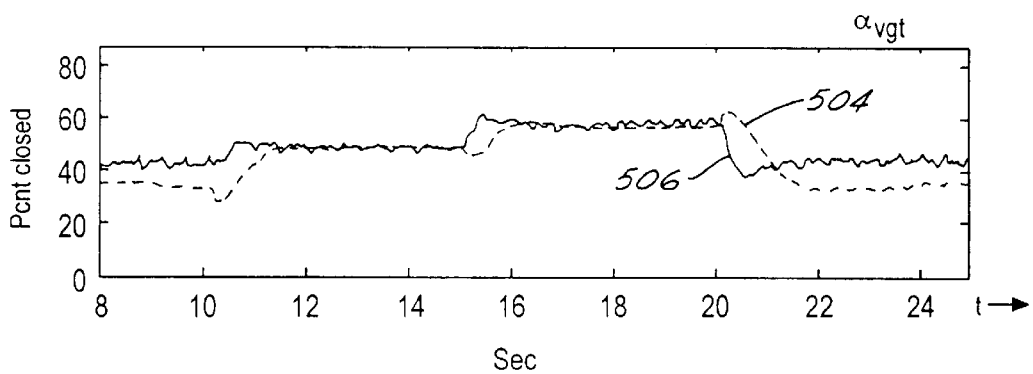

The performance of the novel estimation method for the VGT actuator position is shown in FIGS. 5a–5c. FIG. 5a plots the engine speed (line 500) in RPM for the fueling rate steps of 5-6–7-5 kg/h shown in FIG. 5b. The resulting estimated VGT actuator position is shown in FIG. 5c as line 504, and the measured VGT actuator position is shown as line 506. As can be appreciated, the estimation method exhibits close tracking of the measured VGT actuator position.

While the invention has been described in connection with one or more embodiments, it will be understood that the invention is not limited to those embodiments. For example, instead of estimating the exhaust manifold temperature, it can be measured from a temperature sensor. The structure of the estimation algorithm would remain the same, except that a measured value of $T_2$ is used instead of its estimated value. Accordingly, the invention covers all alternatives, modifications, and equivalents, as may be included within the spirit and scope of the appended claims.

What is claimed is:

1. A method of estimating the actuator position of a variable geometry turbocharger (VGT) in a compression ignition engine having an EGR system including a valve connecting an intake manifold and exhaust manifold of the engine, said VGT including a compressor connected to a turbine having an adjustable inlet guide vane responsive to a VGT actuator signal, the compressor in communication with the intake manifold and the turbine guide vane in communication with the exhaust manifold, the method comprising the steps of:

determining a temperature value ($T_2$) indicative of the exhaust manifold temperature;

determining a turbine flow value ($W_{2t}$) indicative of the mass flow rate through the turbocharger turbine;

determining a pressure value ($p_2$) indicative of the exhaust manifold pressure;

determining a back-pressure value ($p_{exs}$) indicative of the turbine back-pressure; and generating an VGT actuator position estimate ($\alpha_{vgt}$) as a function of $W_{2t}$, $T_2$, $p_2$, and $p_{exs}$.

2. The method of claim 1 wherein the step of determining a temperature value ($T_2$) comprises the steps of:

determining an intake temperature value ($T_1$);

determining an intake flow value ($W_{1e}$) indicative of the engine intake flow rate; and estimating the exhaust temperature ($T_2$) according to the following equation:

$$T_2 = T_1 + k_0(N) W_f / (W_{1e} c_p)$$

wherein $k_0(N)$ represents the energy released by combusting fuel as a function of engine speed (N), $W_f$ represents the engine fueling rate, and $c_p$ represents the pressure specific heat constant for air at 300K.

3. The method of claim 2 wherein said step of determining an intake temperature value ($T_1$) comprises the step of measuring the intake manifold temperature from a temperature sensor.

4. The method of claim 1 wherein the step of determining a turbine flow value ($W_{2t}$) comprises the steps of:

determining an intake flow value ($W_{1e}$) indicative of the engine intake flow rate; and determining an EGR flow value ($W_{2l}$) indicative of the flow rate through the EGR valve;

determining an exhaust flow value ($W_{e2}$) indicative of the exhaust flow rate from the engine to the exhaust manifold as a function of $W_{1e}$ and the engine fueling rate ($W_f$); and estimating $W_{2t}$ as a function of $W_{2l}$ and $W_{e2}$.

5. A method of controlling the airflow into a compression ignition engine having an exhaust gas recirculation (EGR) system including a valve connecting an intake manifold and exhaust manifold of the engine, and a variable geometry turbocharger (VGT) including a compressor connected to a turbine having an adjustable inlet guide vane responsive to a VGT actuator signal, the compressor in communication with the intake manifold and the turbine guide vane in communication with the exhaust manifold, the method comprising the steps of:

determining a temperature value ($T_2$) indicative of the exhaust manifold temperature;

determining a turbine flow value ($W_{2t}$) indicative of the mass flow rate through the turbocharger turbine;

determining a pressure value ($p_2$) indicative of the exhaust manifold pressure;

determining a back-pressure value ($p_{exs}$) indicative of the turbine back-pressure;

generating an VGT actuator position estimate ($\alpha_{vgt}$) as a function of $W_{2t}$, $T_2$, $p_2$, and $p_{exs}$;

retrieving a desired VGT inlet guide vane position value ($\alpha_{vgt}^*$) from a table of values indexed by engine speed and fueling rate;

generating a VGT actuator position command ($U_{vgt}$) as a function of the difference between the desired and estimated VGT actuator position values; and applying $U_{vgt}$ to the turbine guide vane to drive the inlet guide vane to the respective desired values.

6. The method of claim 5 wherein the step of determining a temperature value ($T_2$) comprises the steps of:

determining an intake temperature value ($T_1$);

determining an intake flow value ($W_{1e}$) indicative of the engine intake flow rate; and estimating the exhaust temperature ($T_2$) according to the following equation:

$$T_2 = T_1 + k_0(N)W_f/(W_{1e}c_p)$$

wherein $k_0(N)$ represents the energy released by combusting fuel as a function of engine speed (N), $W_f$ represents the engine fueling rate, and $c_p$ represents the pressure specific heat constant for air at 300K.

7. The method of claim 5 wherein the step of determining a turbine flow value ($W_{2t}$) comprises the steps of:

determining an intake flow value ($W_{1e}$) indicative of the engine intake flow rate; and determining an EGR flow value ($W_{2l}$) indicative of the flow rate through the EGR valve;

determining an exhaust flow value ($W_{e2}$) indicative of the exhaust flow rate from the engine to the exhaust manifold as a function of $W_{1e}$ and the engine fueling rate ($W_f$); and estimating $W_{2t}$ as a function of $W_{2l}$ and $W_{e2}$.

8. In a compression ignition engine system having an exhaust gas recirculation (EGR) passage including an EGR valve connecting an intake manifold and exhaust manifold of the engine, and a variable geometry turbocharger (VGT) including a compressor connected to a turbine, said turbine including an adjustable inlet guide vane, the compressor in communication with the intake manifold and the guide vane in communication with the exhaust manifold, said guide vane responsive to a VGT actuator signal for regulating the intake manifold pressure, an engine control unit for regulating the airflow into said engine, said engine control unit comprising:

memory for storing a map of engine volumetric efficiency as a function of engine operating parameters, a map of the EGR valve effective flow area as a function of said EGR valve position, and a map of the VGT effective flow area as a function of the VGT guide vane position; and a feedback controller for generating said said VGT actuator signal, said feedback controller programmed to:

determine a temperature value ($T_2$) indicative of the exhaust manifold temperature;

determine a turbine flow value ($W_{2t}$) indicative of the mass flow rate through the turbocharger turbine;

determine a pressure value ($p_2$) indicative of the exhaust manifold pressure;

determine a back-pressure value ($p_{exs}$) indicative of the turbine back-pressure;

generate an VGT actuator position estimate ($\alpha_{vgt}$) as a function of $W_{2t}$, $T_2$, $p_2$, and $p_{exs}$;

retrieve a desired VGT inlet guide vane position value ($\alpha_{vgt}^*$) from a table of values indexed by engine speed and fueling rate;

generate a VGT actuator position command ($U_{vgt}$) as a function of the difference between the desired and estimated VGT actuator position values; and transmit $U_{vgt}$ to the turbine guide vane to drive the inlet guide vane to the respective desired value.

9. The engine control unit of claim 8 wherein said feedback controller determines a temperature value ($T_2$) by:

determining an intake temperature value ($T_1$);

determining an intake flow value ($W_{1e}$) indicative of the engine intake flow rate; and estimating the exhaust temperature ($T_2$) according to the following equation:

$$T_2 = T_1 + k_0(N)W_f/(W_{1e}c_p)$$

wherein $k_0(N)$ represents the energy released by combusting fuel as a function of engine speed (N), $W_f$ represents the engine fueling rate, and $c_p$ represents the pressure specific heat constant for air at 300K.

10. The engine control unit of claim 8 wherein said feedback controller determines a turbine flow value ($W_{2t}$) by:

determining an intake flow value ($W_{1e}$) indicative of the engine intake flow rate; and determining an EGR flow value ($W_{2l}$) indicative of the flow rate through the EGR valve;

determining an exhaust flow value ($W_{e2}$) indicative of the exhaust flow rate from the engine to the exhaust manifold as a function of $W_{1e}$ and the engine fueling rate ($W_f$); and estimating $W_{2t}$ as a function of $W_{2l}$ and $W_{e2}$.

* * * * *